(12) United States Patent
Christoph et al.

(10) Patent No.: US 8,210,037 B2
(45) Date of Patent: Jul. 3, 2012

(54) SENSOR MODULE WITH A HOUSING WHICH MAY BE MOUNTED ON A WALL

(75) Inventors: Markus Christoph, Regensburg (DE); Christian Plankl, Burgweinting (DE)

(73) Assignee: Continental Automotive GmbH, Hannover (DE)

( * ) Notice: Subject to any disclaimer, the term of this patent is extended or adjusted under 35 U.S.C. 154(b) by 767 days.

(21) Appl. No.: 12/301,367

(22) PCT Filed: May 16, 2007

(86) PCT No.: PCT/EP2007/054783
§ 371 (c)(1),
(2), (4) Date: Dec. 10, 2008

(87) PCT Pub. No.: WO2007/135070
PCT Pub. Date: Nov. 29, 2007

(65) Prior Publication Data
US 2009/0314081 A1 Dec. 24, 2009

(30) Foreign Application Priority Data
May 18, 2006 (DE) .......................... 10 2006 023 464

(51) Int. Cl.
*G01L 19/14* (2006.01)
(52) U.S. Cl. ........................................................ 73/431
(58) Field of Classification Search .................... 73/431, 73/866.5, 23.31, 23.35
See application file for complete search history.

(56) References Cited

U.S. PATENT DOCUMENTS

| 5,945,606 A | 8/1999 | Tokunaga | |
|---|---|---|---|
| 7,607,364 B2 * | 10/2009 | Duff | 73/866.5 |
| 2002/0069700 A1 | 6/2002 | Dirmeyer et al. | |
| 2004/0050168 A1 | 3/2004 | Uberreiter | |
| 2007/0170779 A1 * | 7/2007 | Miura | 307/10.1 |
| 2007/0272028 A1 * | 11/2007 | Fujimoto | 73/756 |

FOREIGN PATENT DOCUMENTS

| DE | 19737821 A1 | 3/1998 |
|---|---|---|
| DE | 19803358 C2 | 2/2000 |
| DE | 10014146 A1 | 9/2001 |
| DE | 10032616 A1 | 1/2002 |
| DE | 102005044373 A1 | 4/2006 |
| EP | 0984258 A2 | 3/2000 |
| EP | 1146326 A2 | 10/2001 |
| EP | 1662533 A1 | 5/2006 |
| WO | 0071978 A1 | 11/2000 |

* cited by examiner

*Primary Examiner* — Hezron E Williams
*Assistant Examiner* — Tamiko Bellamy
(74) *Attorney, Agent, or Firm* — Laurence A. Greenberg; Werner H. Stemer; Ralph E. Locher

(57) ABSTRACT

A sensor module has a housing that may be mounted about a through opening of an assembly surface. The housing extends at least partly through the through opening when the housing is disposed on the assembly surface. The sensor module further has a sealing body, between the outer surface of the housing and the through opening of the assembly surface and an attachment device, by way of which the housing is fixed to the assembly surface. The attachment device lies on the through opening in order to bring about a mechanical fixation of the housing to the assembly surface.

15 Claims, 4 Drawing Sheets

SENSOR MODULE WITH A HOUSING WHICH MAY BE MOUNTED ON A WALL

BACKGROUND OF THE INVENTION

Field of the Invention

The invention relates to a sensor module having a housing that can be mounted at a feed-through opening of a mounting surface, through which opening the housing of the sensor module at least partially projects when the housing is positioned on the mounting surface. The sensor module further includes a sealing body provided between the exterior of the housing and the feed-through opening of the mounting surface as well as a securing means by means of which the housing can be secured on the mounting surface.

A generic sensor module is known from WO 00/71978 A1. Provided in a water-tight housing is a sensor element that is embedded in a protective means, for example an elastomer compound, and to which the atmosphere or surroundings under pressure can be applied via a through-passage channel. A channel leads from a pressure-sensitive surface or membrane of the sensor element to a pipe stub that can latch into a sealing element located in a housing or wall. This enables variations in ambient pressure to be applied to the pressure-sensitive surface of the sensor without the pressure sensor's being exposed to any ambient humidity. A sealing body is provided between the exterior of the pipe stub and the feed-through opening of the wall. The housing is secured via housing projections disposed in a flange-like manner on the housing and extending in a single plane parallel to the wall. It is secured by means of, for instance, screws. In addition to the feed-through opening it is for that purpose necessary for openings additionally requiring to be sealed to be provided for the screw connection in the mounting wall.

The openings of the sealing elements are usually sealed by way of sealing rings or of foam seals adhesively bonded to the mounting surface. This is a time-consuming and labor-intensive assembly process because a multiplicity of parts (securing means, sealing rings, foam seals, and suchlike) must be supplied that have to be handled during assembly.

BRIEF SUMMARY OF THE INVENTION

It is therefore the object of the present invention to develop a generic sensor module in such a way that simplified mounting of a housing of the sensor module on a mounting surface will be enabled.

An inventive sensor module includes a housing that can be mounted at a feed-through opening of a mounting surface, through which opening the housing of the sensor module at least partially projects when the housing is positioned on the mounting surface. It further includes a sealing body provided between the exterior of the housing and the feed-through opening of the mounting surface as well as a securing means by means of which the housing can be secured to the mounting surface. The securing means is therein applied against the feed-through opening for mechanically securing the housing on the mounting surface.

The provision of openings other than the feed-through opening at which the sensor module is mounted is unnecessary in the case of the inventive sensor module. Fewer sealing means will accordingly have to be provided for separating the surroundings on one side of the mounting surface from the surroundings on the other side of the mounting surface. That variant of the inventive sensor module will furthermore enable simplified mounting on the mounting surface. In particular the securing means can be embodied using fewer components compared with conventional arrangements conforming to the prior art.

The inventive sensor module can be located on one side of the mounting surface which, for example, separates a damp space from a dry space, as can be the case in motor vehicles. A parameter requiring to be sensed by the sensor module can be registered through the wall, with its being ensured that for example electronic circuits and suchlike are protected from the effects of detrimental ambient conditions prevailing beyond the wall. The sensor module can be suitable for sensing, for example, temperatures, humidity levels, and variations in pressure etc.

A structurally simple embodiment will ensue if the securing means according to one variant is at least partially surrounded by the sealing body. The securing means and sealing body can therein be embodied as an integral unit produced by means of, for instance, a two-component injection-molding method.

A particularly simple way to mount the inventive sensor module will ensue from an embodiment variant in which the securing means is formed from a snap-in connector and a retention means. Said embodiment will obviate the need to provide separate securing means such as, for instance, screws, nuts, and bolts requiring to be handled in the course of mounting.

The securing means is expediently embodied by a snap-in fastener having an actuatable retaining section and a back facing the feed-through opening, with the back being embodied at an angle to an insertion direction of the housing and with an end, facing the feed-through opening, of the back being joined via a shoulder that can be supported on the mounting surface to the retaining section when the housing has been mounted on the mounting surface. Said expedient embodiment of the securing means will also enable the sensor module to be released and detached from the mounting surface after being mounted thereon. What is termed a Go/No-Go function is furthermore integrated that will prevent incomplete insertion of the sensor module when being mounted on the mounting surface, as a result of which leakages ensuing from incorrect mounting can be avoided. The Go/No-Go function is furnished by the embodiment of the snap-in fastener, which will deform during mounting and, owing to its restoring force exerted by the back engaging with the feed-through opening, eject the sensor module from the feed-through opening. The restoring force will understandably be applied only for as long as the sensor module is not in its correct final position.

In a further embodiment variant the retention means has a bearing section embodied for taking up a force that is exerted by the snap-in connector and acts in a plane of the feed-through opening when the housing has been mounted on the mounting surface. The bearing section of the retention means is located preferably on the housing opposite the snap-in connector. A defined seating of the sensor module in the feed-through opening will be provided thereby.

It is further preferred for a section of the sealing body to be located between the bearing section and feed-through opening. Imperviousness in cases when the sensor module has been incorrectly mounted on the bearing surface can be ensured thereby.

In a further embodiment variant the retention means has a shoulder that takes up a force acting perpendicularly to the plane of the feed-through opening, with the shoulder being supported on the mounting surface when the housing has been mounted on the mounting surface.

In a further embodiment variant the retention means can include a latch that is supported on the edge of the feed-through opening or on a further feed-through opening separate from it and has a section that takes up a force acting perpendicularly to the plane of the feed-through opening, with the shoulder being supported on the mounting surface when the housing has been mounted on the mounting surface.

Another embodiment provides for the sealing body to have a bearing shoulder that at least partially encompasses the housing and takes up a force acting perpendicularly to the plane of the feed-through opening, with the bearing shoulder being supported on the mounting surface when the housing has been mounted on the mounting surface. The sealing body will thereby not only assume a sealing function but also ensure that the sensor module is correctly seated on the mounting surface.

The securing means is embodied preferably as a single piece with the housing and integrally therewith since just one component will then have to be handled during mounting.

The securing means and sealing body are formed integrally by means of a two-component injection-molding method, as a result of which on the one hand simple production and handling and, on the other, optimal sealing can be achieved.

The housing can basically be of any shape in cross-section, with a substantially round or oval cross-section expediently being preferred. Departure from a symmetric or rotationally symmetric shape will moreover enable positional locking to be provided.

In one embodiment variant a sensor element is located in the housing, with the sensor element being, for example, a pressure sensor. The sensor element can be embodied also as a temperature sensor or for detecting humidity of various kinds.

In a specific embodiment the inventive sensor module is a side airbag satellite.

What has been achieved with the present invention is providing a sensor module that will enable simplified mounting on a mounting surface. The risk of mismounting or incorrect mounting with ensuing leakages will have been minimized owing to an integrated Go/No-Go function. The number of parts comprising the sensor module will have been reduced owing to the securing means' engaging with or being positioned against the feed-through opening for mechanically securing the housing on the mounting surface. The inventive sensor module can moreover be produced in its entirety by means of an injection-molding method, with even the sealing body being able to be molded integrally onto the housing of the sensor module if a two-component injection-molding method is used.

The invention is explained in more detail below with reference to the figures, in which:

DESCRIPTION OF THE INVENTION

Figure 1:
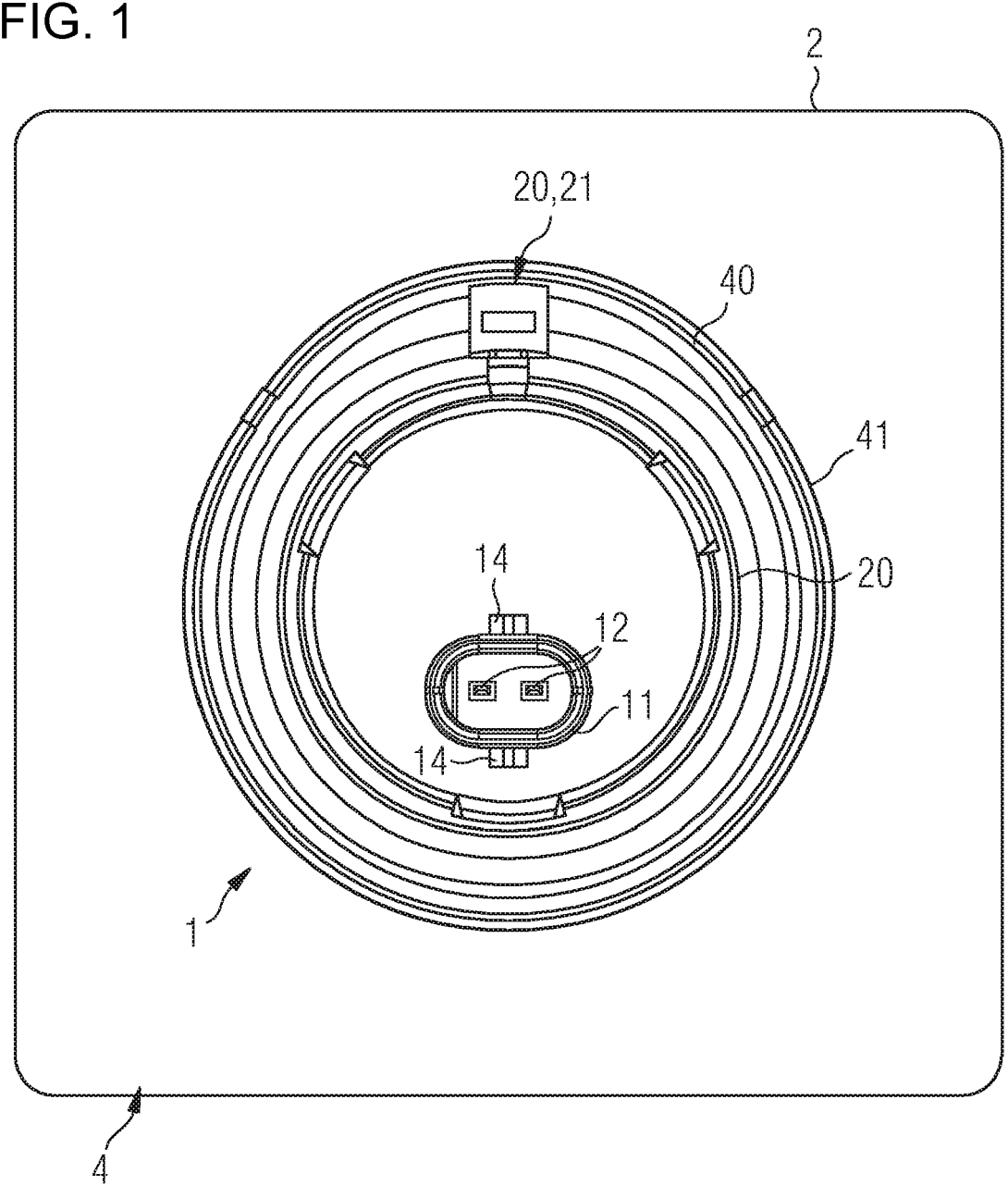
FIG. 1 is a top view onto a sensor module mounted on a mounting surface from the perspective of a mounting side of the mounting surface.

Identical features have been assigned the same reference numerals/letters in the exemplary embodiments described in the description that follows.

Figure 2A:
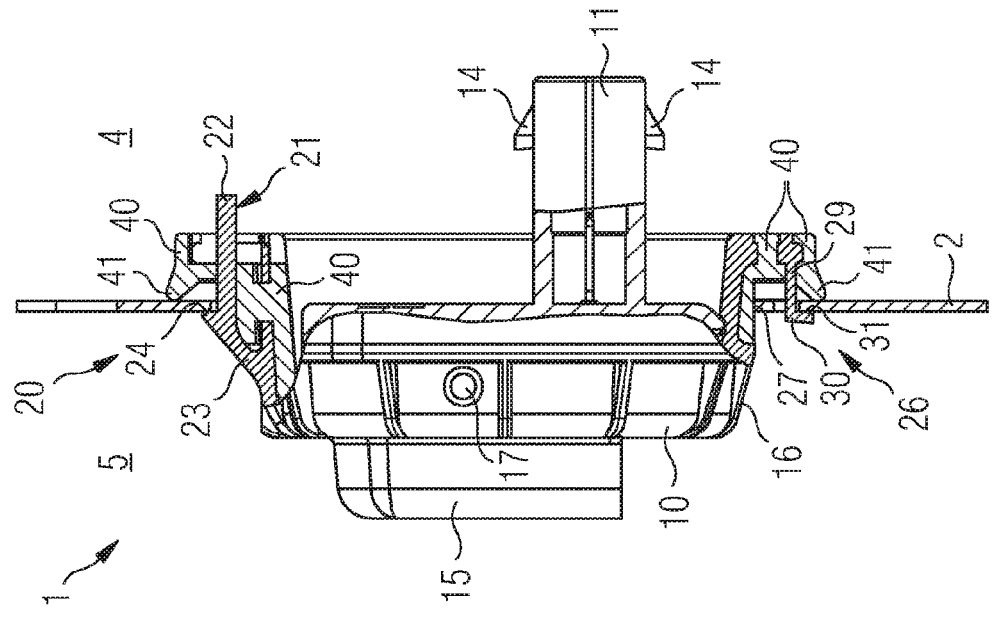
FIGS. 2A, 2B are each a cross-sectional representation of the sensor module mounted in the mounting surface in a first and second embodiment variant.
Figure 2B:
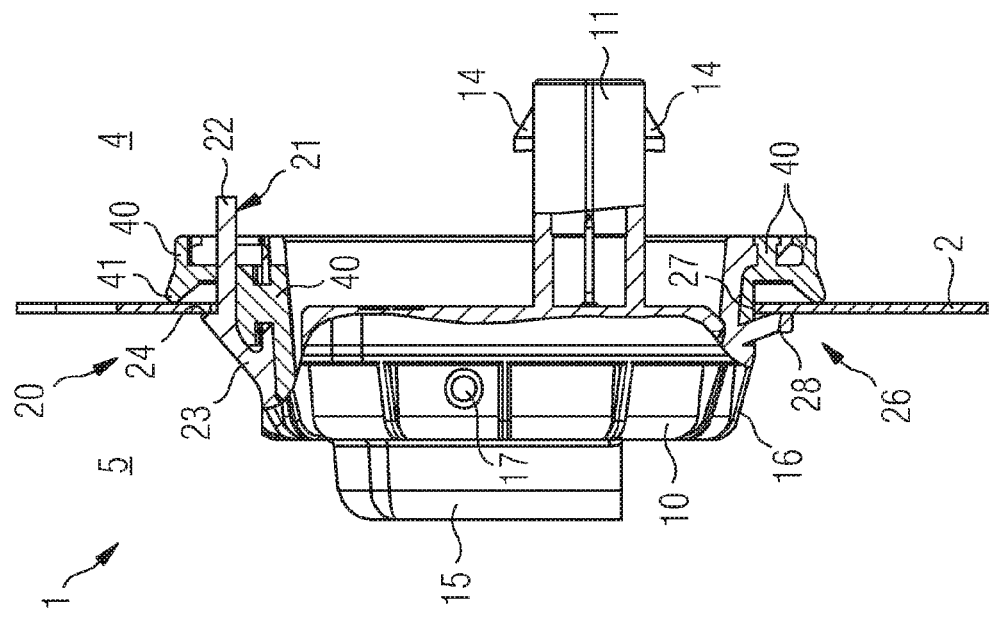
Figure 3A:
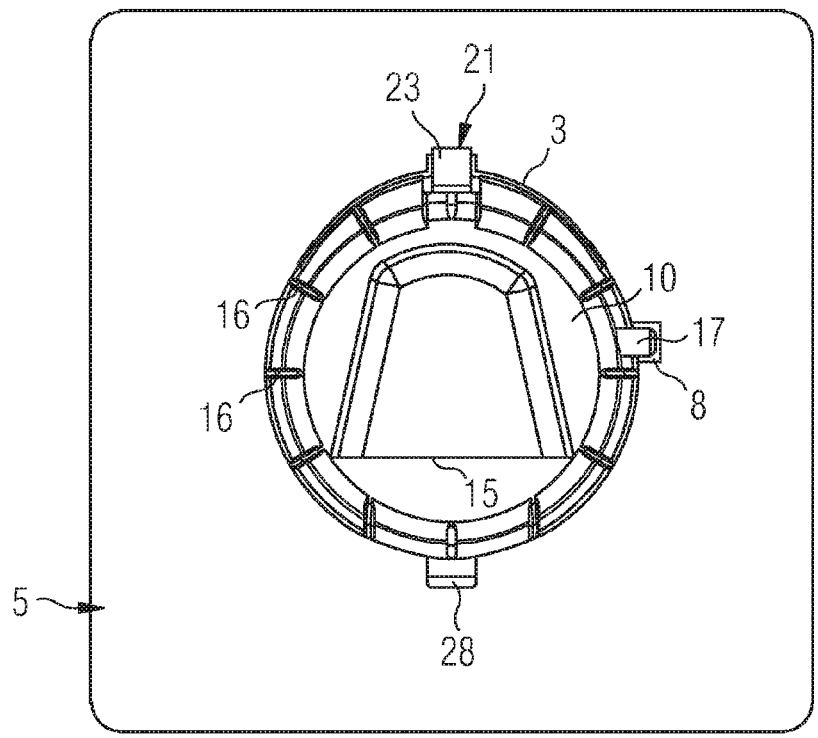
FIGS. 3A, 3B are each a top view onto a sensor module mounted in the mounting surface in the first and second embodiment variant.
Figure 3B:
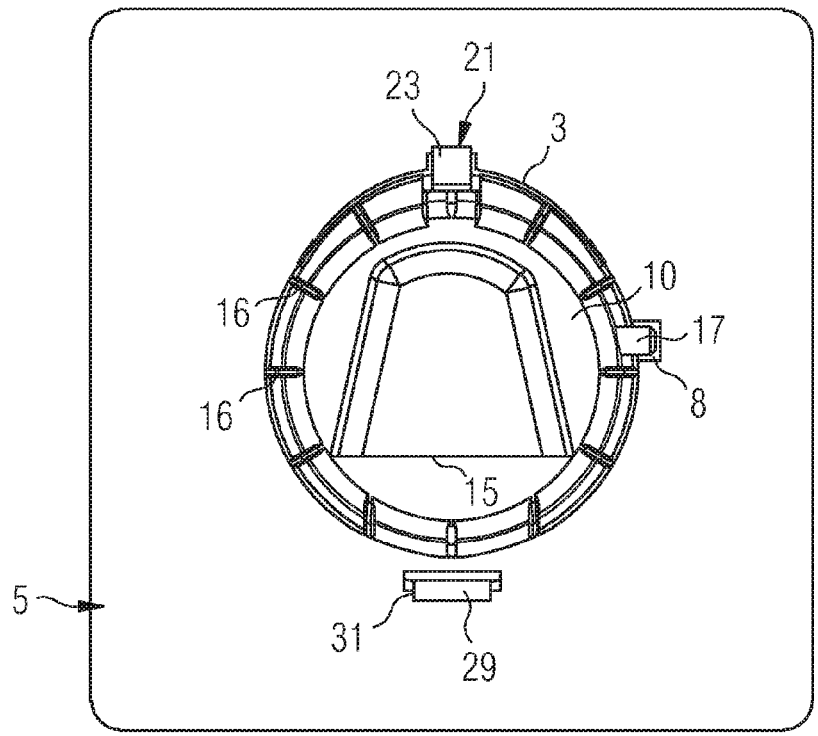
Figure 4A:
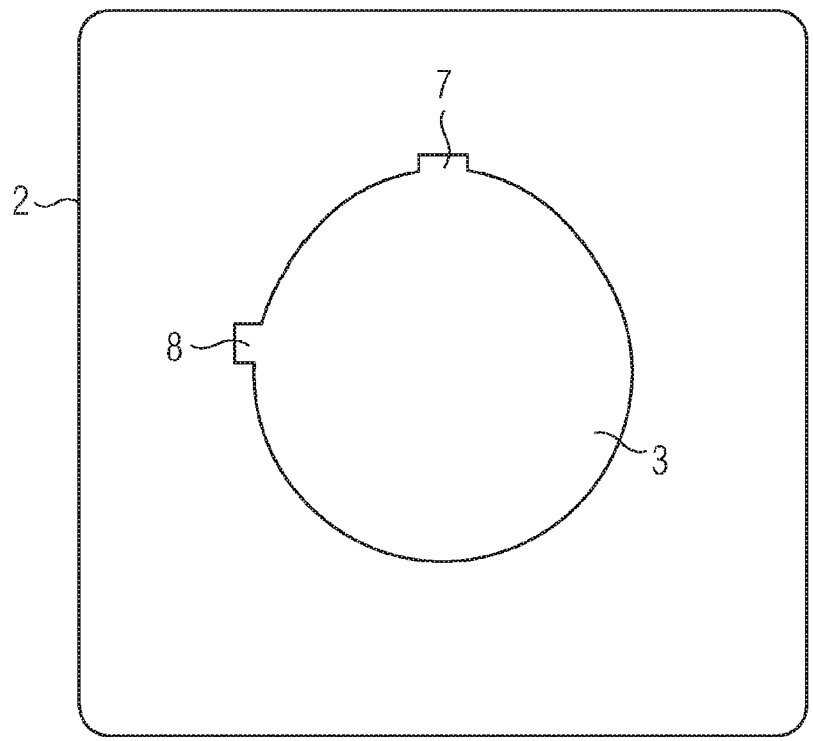
FIGS. 4A, 4B are each a view of the mounting surface for mounting the sensor module according to the first and second exemplary embodiment.
Figure 4B:
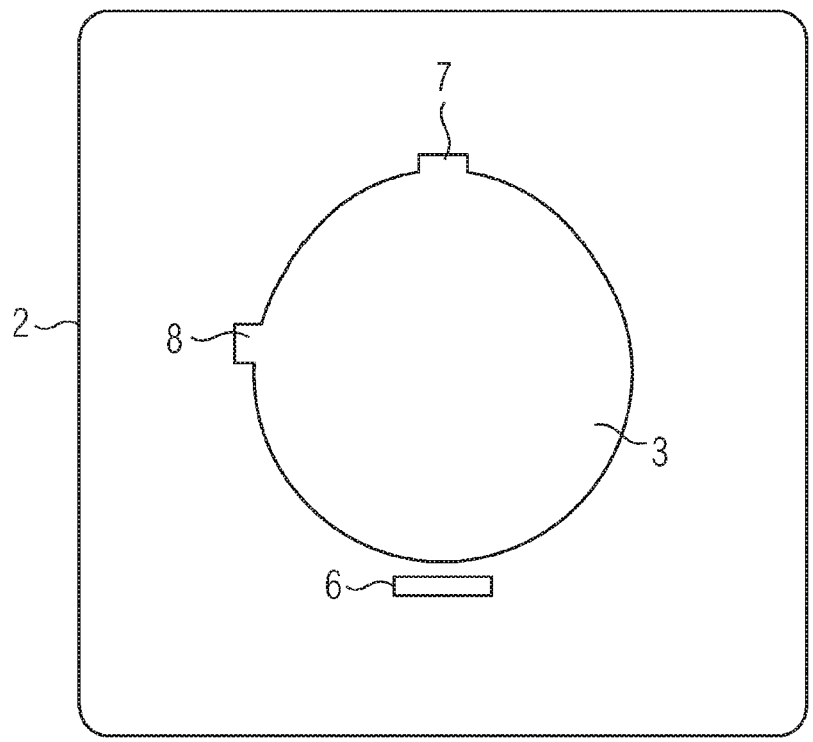

FIGS. 1 to 3 each show a sensor module 1 that is mounted on a mounting surface 2. FIGS. 1, 2A, and 3A therein relate to a first embodiment variant and FIGS. 2B and 3B to a second embodiment variant. FIG. 4A shows a mounting surface corresponding to the first embodiment variant, while the mounting surface shown in FIG. 4B is assigned to the second embodiment variant.

The sensor module 1 includes a housing 10 embodied for accommodating an electronic circuit. The electronic circuit can be embodied for, for example, what is termed a side airbag satellite and is protected in the housing 10 from environmental influences. The electronic components include in particular a sensor element such as, for example, a pressure sensor embodied for sensing external ambient influences.

A side airbag sensor of said type is located in a motor vehicle, for example in a side door. The mounting surface 2 is, for example, a dividing wall in a motor vehicle, with a mounting side, identified by the reference numeral 4, of the mounting surface 2 facing a dry space while a side on the opposite rear side 5 of the mounting surface 2 faces a wet or damp space.

FIG. 1 shows the sensor module 1 mounted on the mounting surface 2 from the perspective of the mounting side 4 of the mounting surface 2. The housing 10 is located in a feed-through opening 3 of the mounting surface 2 and secured in position in the feed-through opening 3 via a securing means 20. The securing means 20 includes a snap-in fastener 21 and a retention means 26 that is not shown in FIG. 1. Of the snap-in fastener 21, a retaining section 22 extending toward the observer can be seen in the top view shown in FIG. 1. The housing 10 is retained and secured in position in the mounting opening 3 exclusively via the snap-in fastener 21, with the retention means 26 constituting a defined positional securing point for producing a counterforce.

Embodied circumferentially around the housing 10 is a sealing body 40 located between the exterior of the housing 10 and the feed-through opening 3 of the mounting surface 2. What is a special feature of the sealing body 40 is that it surrounds the snap-in fastener 21 and retention means 26 so that no non-tight place whatever will arise even at the retaining points. A bearing shoulder 41 that simultaneously assumes a retaining function fits snugly against the circumferential edge of the mounting opening 3 in order to obtain a tight closure.

Extending outward from the drawing plane there is furthermore a contact socket 11 having contact pins 12 arranged thereon for mechanically and electrically contacting the sensor module 1. Embodied laterally on the contact socket 11 embodied by way of example as being approximately oval in shape are two projections 14 embodied as roughly wing-shaped for enabling reliable securing of a contact plug.

The structure of an inventive sensor module 1 can better be seen in the cross-sectional representation shown in FIG. 2. Just the exemplary embodiment according to FIGS. 2A and 3A will be dealt with firstly. Differences compared with the second exemplary embodiment according to FIGS. 2B and 3B will then be highlighted.

It can be seen from FIG. 2A that the sealing body 40 completely surrounds the roughly circular housing 10 and is located between the exterior of the housing 10 and the feed-through opening 3 of the mounting surface 2. The sectional representation furthermore shows that the sealing body surrounds the securing means 20. The securing means 20 and sealing body 40 can have been embodied mutually integrally by means of, for example, a two-component injection-molding method. A plastic material exhibiting greater hardness is therein used for the securing means 20, while the plastic material used for the sealing body exhibits greater elasticity. One or more openings 25 can be provided in the securing means 20 for achieving a stable mechanical link between the securing means 20 and sealing body 40.

What can clearly be seen is the bearing shoulder 41 of the sealing body 40, which shoulder from the perspective of the mounting side 4 presses circumferentially around the feed-through opening 3 against the mounting surface 2. A tight closure from the mounting side 4 to the rear side 5 of the mounting surface is provided thereby.

The securing means 20 includes the snap-in fastener 21 which in FIG. 2A is located at the top. The snap-in fastener 21 is formed by a retaining section 22 and a back 23 arranged at an angle. The back 23 and retaining section 22 are linked by a shoulder 24 which is applied against the mounting surface 2 when the housing 10 is in its mounted condition. The snap-in fastener 21 can be pushed toward the interior of the feed-through opening 3 via the retaining section 22, as a result of which the shoulder 24 will be pressed downward. The housing 10 can thereby be swiveled toward the mounting side 4 of the mounting surface 2 through a swiveling motion around the retention means 26 located opposite through 180° on the housing. The sensor module 1 can thereby be detached from the mounting surface 2. Installation takes place in reverse order by passing the retention means having a bearing section 27 and a shoulder 28 with its shoulder 28 from the mounting side 4 through the feed-through opening 3, then positioning the bearing section 27 against the edge of the feed-through opening 3 and performing a swiveling motion toward the rear side 5.

The securing means 20 includes what is termed a Go/No-Go function. This is a functionality preventing the sensor module from remaining in an undefined position in which imperviousness cannot be ensured after it has been mounted on the mounting surface 2. The Go/No-Go function is provided by the back 23 of the snap-in fastener 21. The shoulder's course extending from the edge of the feed-through opening 3 toward the interior of the feed-through opening 3 effects a restoring force that will push the non-snapped-in housing 10 back toward the mounting side 4. In other words it means the restoring force will not cease being applied through the back 23 until said back has completely traversed the edge of the feed-through opening 3, with the bearing shoulder 41 of the sealing body 40 then preventing a movement extending beyond the ability of the sealing body 40 to be compressed. That situation is shown in FIG. 2. The way the shoulder 24 and bearing shoulder 41 are dimensioned produces a force equilibrium at which the sensor module 1 will be held reliably in position on the mounting surface 2.

As has already become clear from the foregoing description, the retaining element 26 serves to secure the housing 2 at a location opposite the snap-in fastener 21. The shoulder 28 of the retention means 26 establishes a force directed against the bearing shoulder 41. The bearing section 27 takes up a force directed in the plane of the mounting surface 2.

The unit comprising the securing means 20 and sealing body 40 can be embodied integrally on the housing 10. That means the securing means 20 and housing 10 can be produced, for example, within the scope of the same injection-molding process and from the same plastic material or else from different plastic materials by means of the two-component injection-molding method.

What can better be seen from the cross-sectional representation is the contact socket 11 that extends toward the mounting side 4 and has the projections 14 located on its exterior for latching with a contact plug (not shown). Embodied on the opposite side of the housing 10 is an air scoop 15 which constitutes a mechanical protection for the sensor located inside the housing from humidity. The air scoop 15 has an opening on, for example, its underside so that the sensor element is in contact with the surroundings on the rear side 5 of the mounting surface 2. The top view in FIG. 3A shows the shape, roughly trapezoidal by way of example only, of the air scoop 15 having the opening in the downward direction with respect to the sheet.

Identified by the reference numeral 17 is a coding pin that extends outward from the drawing plane toward the observer. The coding pin 17 serves to ensure that the sensor module 1 will be installed in its correct position on the mounting surface 2. For that purpose the coding pin 17 matches a corresponding recess 8 on the feed-through opening 3. Said recess is identified in FIG. 4A by the reference numeral 8. The corresponding arrangement of the coding pin 17 and recess 8 can further readily be seen in the top view from the perspective of the rear side 5 (FIG. 3A).

If the housing 10 has further, optional bore holes (not shown) for example in the area between two stiffening ribs 16, then the coding pins can be inserted as a separate part following final assembly. It will thereby be possible to broaden the range of variants because a particular variant will only be established on completion of assembly.

As can likewise be seen from FIGS. 2A and 3A, the housing 10 has, on its side facing the rear side 5 of the mounting, surface a plurality of stiffening ribs 16 that are only optional in nature.

The top view in FIG. 3A further shows the back 23, applied against a recess 7 of the feed-through opening 3 (see FIG. 4A), of the snap-in fastener 21. The recess 7 on which the shoulder of the back 23 is supported is not mandatory, but a horizontal recess will be more advantageous owing to the forces from the snap-in fastener 21 acting upon the feed-through opening 3. What can further be seen is the shoulder 28, supported on the underside of the feed-through opening 3, of the retention means 26.

The retention means 26 is embodied differently in the second exemplary embodiment, shown in FIGS. 2A, 3A, and 4A by a sectional view from the side and by a top view from the rear side of the mounting surface 2, and by the mounting surface 2 corresponding thereto. The retention means 26 is supported in that exemplary embodiment not directly on the edge of the feed-through opening 3. Rather it is the case that a further feed-through opening 6 (see FIG. 4B) is embodied in the mounting surface 2 that is located opposite the recess for the snap-in fastener 21. The further feed-through opening 6 is roughly oblong in shape with straight lateral edges through which a latch-shaped element 29 having a shoulder 31 can be inserted. The forces acting in the plane of the mounting surface 2 are now taken up not by the bearing section 27 but rather by a straight section 30 of the latch 29. Mounting takes place in the same way as described above. Sealing takes place in that the section, projecting through the feed-through opening 6, of the latch 29 is surrounded by a part of the sealing body or, as shown in the cross-sectional representation in FIG. 2B, in that the bearing shoulder 41 outside said section is applied against the mounting surface 2.

What is provided by the present invention is a sensor module in the case of which additional securing means are eliminated. In the absence of recesses provided in addition to the feed-through opening necessary for the sensor module, less complex sealing will be required. Securing takes place via a snap-in fastener, with a Go/No-Go function having been integrated. That feature will prevent incomplete insertion of the sensor module and associated leakages after it has been mounted on the mounting surface. The functionality is provided by the snap-in fastener that will be deformed during mounting and, owing to its restoring force, eject the sensor module from the feed-through opening if not having reached its end position in the mounting surface. A seal that encompasses the housing and surrounds the securing means seals the sensor module on the mounting surface. It is therein possible in a simple way to provide different thicknesses of the mounting surface by modifying the sealing body. The thickness of the mounting surface can also be compensated by way of the soft, flexible seal.

The inventive sensor module can be dismounted in a simple manner from the mounting surface. That is possible because the locking mechanism is accessible from the mounting side of the mounting surface.

The possibility of integrally embodying the housing, securing means, and sealing body by means of, for instance, a two-component injection-molding technique allows simple and economical production. It is also possible, irrespective of that, to produce the housing and unit from a securing means and sealing body separately and to mount them together in a further processing step.

The possibility exists of coding the sensor module in a simple manner by means of one or more coding pins. Openings may already be provided in the housing for that purpose. The coding pins can on the one hand indicate in the course of production that the sensor module has been checked and, on the other, serve as an optical distinguishing feature in the case, for example, of different electronic components. Security of mounting will be increased if the feed-through opening is provided with a corresponding recess for the coding pin(s).

The invention claimed is:

1. A sensor module, comprising:
   a housing for mounting at a feed-through opening of a mounting surface, said housing projecting at least partially through said feed-through opening when said housing is positioned on the mounting surface;
   a sealing body provided between an exterior of said housing and the feed-through opening of the mounting surface;
   a securing device for securing said housing on the mounting surface, said securing device lying against the feed-through opening for mechanically securing said housing on the mounting surface; and
   a sensor element disposed in said housing;
   wherein said securing device includes a snap-in connector and a retention means: and
   wherein said securing device is a snap-in fastener having an actuatable retaining section and a back facing the feed-through opening, wherein said back is formed at an angle to an insertion direction of said housing and wherein an end, facing the feed-through opening, of said back is joined via a shoulder that can be supported on the mounting surface to said retaining section when said housing has been mounted on the mounting surface.

2. The sensor module according to claim 1, wherein said securing device is at least partially surrounded by said sealing body.

3. The sensor module according to claim 1, wherein said retention means has a bearing section configured to take up a force that is exerted by said snap-in connector and acts in a plane of the feed-through opening when said housing has been mounted on the mounting surface.

4. The sensor module according to claim 3, wherein said bearing section of said retention means is located on said housing opposite said snap-in connector.

5. The sensor module according to claim 3, wherein a section of said sealing body is disposed between said bearing section and the feed-through opening.

6. The sensor module according to claim 3, wherein said retention means is formed with a shoulder configured to take up a force acting perpendicularly to a plane of the feed-through opening, and wherein said shoulder is supported on the mounting surface when said housing is mounted on the mounting surface.

7. The sensor module according to claim 3, wherein said retention means includes a latch supported on an edge of the feed-through opening or on a further feed-through opening separate therefrom, and a section configured to take up a force acting perpendicularly to a plane of the feed-through opening, with said section being supported on the mounting surface when the housing is mounted on the mounting surface.

8. The sensor module according to claim 1, wherein said sealing body has a bearing shoulder at least partially encompassing said housing and configured to take up a force acting perpendicularly to a plane of the feed-through opening, and wherein said bearing shoulder is supported on the mounting surface when the housing is mounted on the mounting surface.

9. The sensor module according to claim 1, wherein said securing device is integrally formed as a single piece with said housing.

10. The sensor module according to claim 1, wherein said securing device and said sealing body are integrally formed as a two-component injection-molding unit.

11. The sensor module according to claim 1, wherein said housing is substantially round or oval in cross-section.

12. The sensor module according to claim 1, wherein said sensor element is a pressure sensor.

13. The sensor module according to claim 1, wherein the module is a side airbag satellite.

14. The sensor module according to claim 1, wherein said housing includes a contact socket with at least one electrical contact pin.

15. A sensor module, comprising:
   a housing for mounting at a feed-through opening of a mounting surface, said housing projecting at least partially through said feed-through opening when said housing is positioned on the mounting surface;
   a sealing body provided between an exterior of said housing and the feed-through opening of the mounting surface;
   a securing device for securing said housing on the mounting surface, said securing device lying against the feed-through opening for mechanically securing said housing on the mounting surface; and
   a sensor element disposed in said housing;
   wherein said securing device includes a snap-in connector and a retention means;

wherein said retention means has a bearing section configured to take up a force that is exerted by said snap-in connector and acts in a plane of the feed-through opening when said housing has been mounted on the mounting surface; and wherein said bearing section of said retention means is located on said housing opposite said snap-in connector.

* * * * *